(12) United States Patent
Hollberg et al.

(10) Patent No.: US 6,567,798 B1
(45) Date of Patent: May 20, 2003

(54) METHOD AND SYSTEM FOR CONSISTENT UPDATES OF REDUNDANT DATA IN RELATIONAL DATABASES

(75) Inventors: Ulf Hollberg, Wiesloch (DE); Winfried Gessinger, Lindlar (DE); Ian Spencer, Neu-Isenburg (DE)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 09/676,110

(22) Filed: Sep. 29, 2000

(30) Foreign Application Priority Data

Sep. 29, 1999 (EP) .............................. 99119398

(51) Int. Cl.[7] .............................................. G06F 17/30
(52) U.S. Cl. ........................................................ 707/2
(58) Field of Search ................................ 707/1, 2, 100, 707/200

(56) References Cited

U.S. PATENT DOCUMENTS

| | | | | |
|---|---|---|---|---|
| 4,918,593 A | * | 4/1990 | Huber | 707/200 |
| 5,133,068 A | * | 7/1992 | Crus et al. | 707/100 |
| 6,249,849 B1 | * | 6/2001 | Day et al. | 707/201 |
| 6,289,471 B1 | * | 9/2001 | Gordon | 714/6 |

* cited by examiner

*Primary Examiner*—Safet Metjahic
*Assistant Examiner*—Haythim J. Alaubaidi
(74) *Attorney, Agent, or Firm*—Scully, Scott, Murphy & Presser; Louis P. Herzberg

(57) ABSTRACT

An improved method for consistent updates of redundant data in a database is achieved advantageously by providing a dependency model identifying source fields and respective derived fields. The model having the necessary information for dependent data to be identified and calculated on a change of respective source data according to some predetermined rules. Further, by recording changes, i.e., modifications to data involved in a redundancy, and propagating changes including cascaded changes directed to the derived fields using the rules defied in said dependency model. Advantageously, the dependency model is stored as a database table (2) and the changes are recorded in a change table in the database. The step of recording changes is separated from the step of propagating changes to derived fields in order to improve performance.

12 Claims, 3 Drawing Sheets

METHOD AND SYSTEM FOR CONSISTENT UPDATES OF REDUNDANT DATA IN RELATIONAL DATABASES

BACKGROUND OF THE INVENTION

1. Technical Field

The present invention relates to design of relational data bases. In particular, the present invention relates to the problem of creating and maintaining semantic consistency in the presence of redundant data in a relational database.

2. Prior Art

The design of relational data bases is a well established discipline. The classical design of relational databases is based on the development of an information model, often in an Entity/Relationship (E/R)-Notation.

A major concern for the design is the avoidance of redundant information in order to avoid updates which may lead to inconsistent data.

However, the disadvantage of having no redundant information in the data base is that time critical applications may not be able to access the data quickly enough.

These opposing problems, performance optimisation through redundant data vs. maintaining the consistency of the redundant data, can not be addressed sufficiently through prior art approaches.

Only one prior art approach has been found which appears to be related to the subject of the current invention which is disclosed in U.S. Pat. No. 5,369,761. The invention disclosed therein is to save time on read operations by avoiding joins between different tables. It is proposed to simply copy fields from a source table—in the normalized database layout—into other tables where they may be used with the other fields thus avoiding excessive database join operations which are known to be costly.

Said prior art invention and the present invention target at different problems in different ways but both using not-normalized databases. The cited prior art approach is based upon the existence of a normalized database which is then stepwise de-normalized transparently by the database administrator. Upon every access—read, insert, or update—the query needs to be translated to access the fields.

The understanding, however, that normalized databases are not the most intuitive data model, but artifacts which need to be built to compensate for the lack of support to cope with redundancy in databases should be considered for the purpose of the present invention.

The more natural design and usage of databases, however, is based upon the original un-normalized database design. With the approach according to the present invention, there is no need of any modifications on read statements, because the applications accessing the database use the real existing database layout. For database usage profiles with a large percentage of reads compared to writes, this is a considerable performance gain.

Therefore, an object of the present invention is to provide an improved method and system for database access having a better performance in using redundant data.

It is another object of the present invention to provide such method and system having a broader area of application, i.e. which is applicable to database modifications initiated by any program interface accessing the database.

It is another object of the present invention to provide such method and system which avoids complicated procedures required on recovering data consistency in case of a system failure.

SUMMARY OF THE INVENTION

These objects of the invention are achieved by the features stated in enclosed independent claims. Further advantageous arrangements and embodiments of the invention are set forth in the respective subclaims.

The present invention is based on the fact that in relational database technology there is no formalised information about dependencies between fields of the data base in state of the art data base schema information. Thus, every application using the database needs to have built-in knowledge of these dependencies, or determine that by some other means.

According to a first aspect of the present invention it is proposed to provide a method and system for optimizing access to a database of a computer, in which said database has a schema information being extendible to comprise information on redundant data, and which method comprises the provision of formalized information about dependencies between fields of the database in order to consistently update redundant data contained in the database.

In particular, the method of the present invention is characterized by the steps of providing said formalized information as an extension to the existing database schema information.

This is achieved advantageously by providing a dependency model identifying source fields and respective derived fields, said model comprising the necessary information for dependent data to be identified and calculated on a change of respective source data according to some predetermined rules, further by recording changes, i.e., modifications to data involved in a redundancy, and propagating changes including cascaded changes directed to said derived fields using said rules defined in said dependency model. The step of recording changes is separated from the step of propagating changes to derived fields in order to improve performance.

Many advantages are achieved by this inventional approach:

As the inventional Dependency Model is concerned it provides the necessary information for redundant data to be identified and calculated in a timely manner. The Dependency Model contains information that identifies the dependency, the type of dependency, documents the rules for derivation (e.g. calculation, summation), identifies the set of source and destination fields of the redundant data. A general advantage of the Dependency Model is that it provides the base for a generic solution to the problem of redundant data.

With respect to the Change Recorder it records changes to data involved in a redundancy. Preferably, the Change Recorder is implemented as a database trigger. This has the advantage over other solutions that all changes are guaranteed to be recorded. Further, because all changes are written into a Change Table as a part of the original transaction that modifies the data preferably only the data changes that have been committed are recorded.

With reference to the Change Propagator it uses the rules defined in the Dependency Model and the entries in the Change Table to derive the value of the redundant data. If, according to a preferred feature of the inventional concepts the Change Propagator is implemented as a database job then the advantage results that all redundant data can be calculated and maintained in a central place.

A further advantage is that in modern relational databases the timing of such a job can be configured. Such a precisely timed change propagating job can advantageously be run either directly after the commit of the transaction involving the Change Recorder, so that a consistent data is always present, or after a predetermined time interval as e.g., every second or at the end of each month which depends on the actual business environment.

Further, as a great advantage over prior art any application logic regarding redundancy problems will be removed. This is an important factor as there are often a plurality of applications dedicated to process derived fields. This is achieved by the automatic propagation of changes to fields to the semantically dependent fields. By only having to update the source data and not the redundant data, said applications updating data involved in a redundancy can not corrupt the consistency of the data base. Thus, the applications are relieved from understanding semantical dependencies in the data base and from computing. The semantical dependencies are encapsulated in the Dependency Model and the logic for recording changes and distributing said changes properly to derived fields, is implemented in the Change Recorder and Change Propagator, respectively.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

The following definitions are introduced in order to enhance clarity of the disclosure following down below.

| Term | Definition |
| --- | --- |
| Field | An attribute of an encapsulation of a concept |
| derived field | A field of which the value is dependent on one or more other fields |
| source field | A field required for the calculation a derived field |
| dependency relation | A named and typed relationship between a set of source fields and a set of derived fields. The dependency relation specifies the rules for derivation between the two sets of fields. |
| cascading change | The case where a derived field is also a source filed in another dependency relation. The original change cascades through the database |

-continued

| Term | Definition |
| --- | --- |
| change table | A database table where the changes to source fields are recorded |
| propagation field | A field that is maintained purely for the change propagator. The field is not part of the "natural" encapsulation of the entity. |

Figure 1:
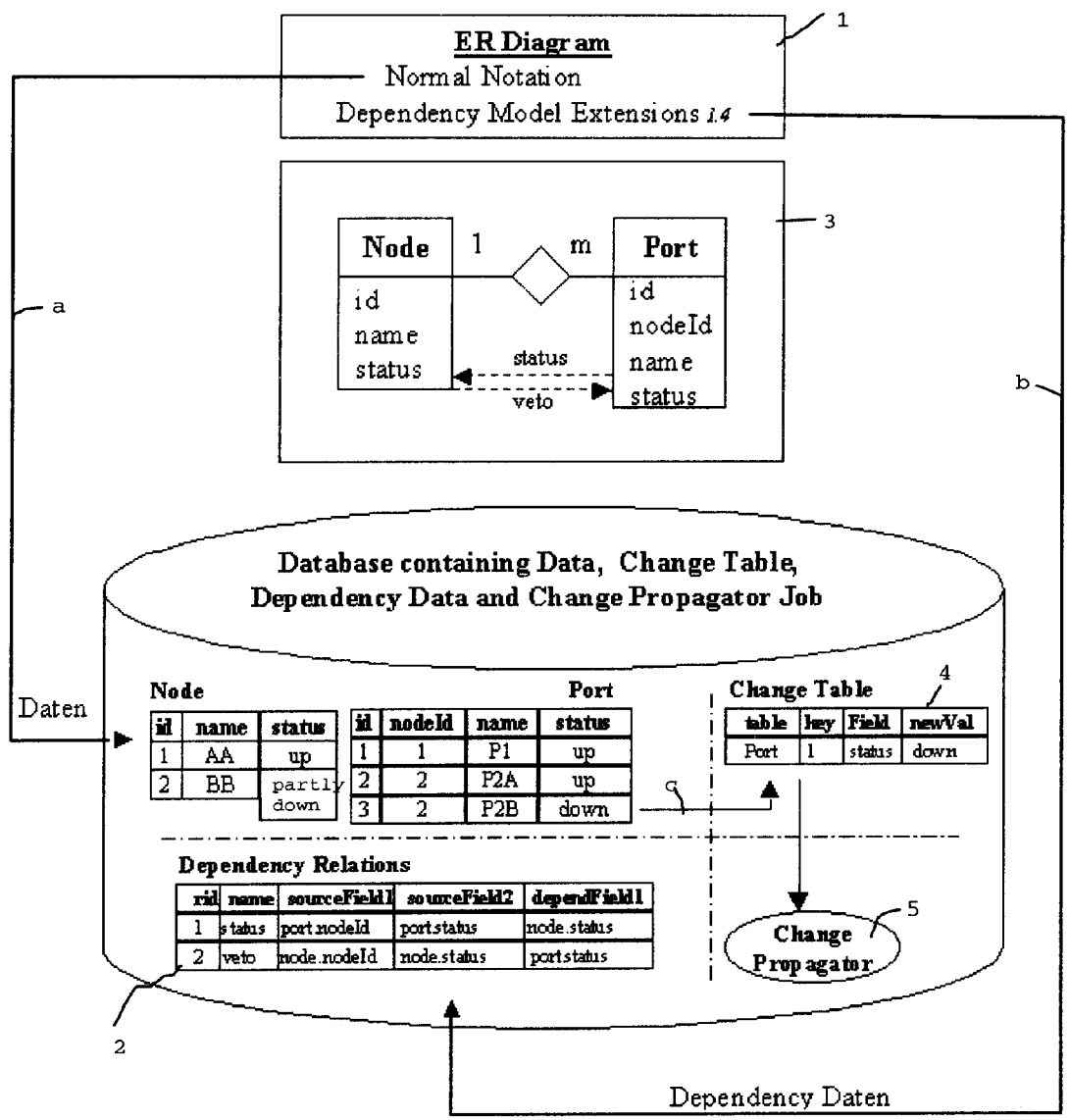
FIG. 1 is a schematic representation sketching an overview of all major components participating in the method according to the invention.

With reference to FIG. 1 first an overview of the inventional concepts will be given next below.

In the upper box of the drawing a schema 1 is given for indicating by an arrow 'a' that a standard Entity Relationship (ER) model is used for describing a redundant database schema which is depicted in the bottom 'database area' of the drawing and containing exemplarily the entities 'Node' and 'Port' with their respective attributes which will be described in more detail below.

The dependency model relies on the specification of dependency relations depicted in a box 2. A-field may be involved in several dependency relations with another field. The different dependency relations between two fields are distinguished by their names.

In this sample, the database contains data about a data network in two tables, one table 'Node' for the nodes of the network and one table 'Port' for the ports of the nodes in the network. In a non-redundant schema only the table 'Port' would contain a status field. A node may contain several ports as indicated by 1 and m in box 3 the drawing. The status of the node is dependent on the statuses of the ports contained in the node.

This example is now described holding redundant data such that 'Node' contains a derived field and therewith a redundant field 'status'. The field status in the table 'Node' should contain the summary status of all ports in the node. This is depicted in the second upper box 3. The node status can become inconsistent in one of the following cases:

a) port changes its status and the node status is not updated.

b) a port record is inserted or deleted and the node status is not updated to reflect the new or missing port c) the status of the node is directly set by someone using SQL or another application.

In every case, extra action is needed to re-establish the consistency of the data base.

Further now, there is introduced a new relationship "veto" defined between Node and Port, as depicted in the box 3. This relationship describes the desired effect, that when the Node has a status down, all Ports should be set to down. A real life example of the need for this effect may be, e.g., in the case of a power failure, where alarms are received meaning that the node and all ports are down.

According to the invention the existence of dependency relationships is specified by some extensions indicated in box 3 which exist in form of some annotations to the regular relationships in the E/R-Model. These annotations are transformed into a suitable format and stored in the database like other information on the data model, see arrow 'b' and box 2. This information identifies the source fields and the derived fields. The following information is needed about the relation.

| Information | Description |
| --- | --- |
| relationID | Unique Identifier of the dependency relation |
| name | Name of the dependency relation |
| SourceFieldList | The list of the source fields used in the dependency relation |
| derivedFieldList | The list of derived fields in the dependency relation |

On a change of a predetermined source field a source field trigger is fired. see arrow 'c' in FIG. 1 which records this change in form of an insert in a so-called change table 4, whereby the new value —if present—is inserted in the associated entry, too. Here, the new value is depicted as being "down".

Then, said changes of source fields are propagated to any concerned derived fields with a mechanism 5 called Change Propagator such that finally all derived fields have their respective current value imposed by said one change in said source field.

It is obvious that many different scenarios exist which can be used to transport said information depicted above into the logic comprised of the change propagator. For a good performance it is proposed exemplarily to create classes for each entity, each class having objects provided with a number of attributes as e.g. status in the above example. Then, the logic relationships can be transformed into program logic, and code portions of said logic reflecting said relationships between the information depicted above can be created. These code portions can advantageously be run as an executable piece of code instead of realizing it by predicate logic techniques. The inventional concepts, however are more general and cover all of said scenarios mentioned above.

Next, the inventional method for optimizing database access will be described with special reference to FIG. 2.

Firstly, details of the change recorder will be described. After having established a mapping between all source fields and their respective plurality of derived fields, step 8, for all source fields, a database trigger is set up which is activated by changes to the field—step 10. The trigger mechanism is available in state-of-the-art databases; it allows for additional processing to be associated with normal database operations such as update and delete. According to the invention the triggers fire—step 20—upon a change to the source field and write respective entries into a change table in the data base—step 30. The entries in the change table are committed with the original transaction—steps 40, 50. Then, according to the present invention control is passed to the Change Propagator algorithm 13 step 60 which will be appreciated by a person skilled in the art when understanding the problems caused by blocking mechanism described next below.

In some configurations, however, there can exist a so-called blocking problem which will be described and discussed below.

Generally, it would be possible to implement the calculation of derived fields in the database triggers. This would have the big advantage that the database is always in a consistent state. This may be possible in certain systems, for example where are simple dependencies or where are only a few updating processes or where are only low rate of changes to the data.

In large and sophisticated systems, however, where completely different conditions are present the question arises whether to store redundant data. In such systems the following conditions and facts prevail:

Dependencies without redundant information are complicated and compute intensive, there are multiple processes updating the source fields, and there is a high rate of data changes, or a high peak rate of data changes possible, e.g., a blackout causes tens of thousands of Node or Port down status changes.

If the calculation of all derived fields takes place in the change recorder, then in a complicated system with many derived fields, cascading changes and multiple updates, it is possible that substantial blocking problems arise. A blocking problem occurs when a database transaction locks resources that another transaction needs and does not give them free in an acceptable amount of time.

An example of the effect of this blocking and the decision for a separate Change Propagator process is described below.

In this example, all derived fields and cascading changes are implemented in the Change Recorder. In the system presented here, updates to Nodes and Ports usually occur automatically from messages from the Network Management System (NMS). However sometimes messages are lost or are not able to be sent. In this case the network operator must enter the changes manually.

A network operator receives a call informing her that a port has gone down. The network operator enters this information into her computer. A database transaction (A) is started, which updates the status of the port. The triggers on the source field Port.status propagate that to the status field of the affected node. Before the change is committed the computer asks the operator to confirm her entry. Unfortunately, the operator has just gone to lunch. During her lunch, messages start arriving from the Network Managing System (NMS) about the status of a second port of the same node. These messages result in a transaction B. Unfortunately, transaction B requires the same Node record as transaction A and is blocked until transaction. A is completed. In this case, it is blocked until the operator has had her lunch, which is quite late.

Whether manual intervention is involved or not, performing all calculations in the Change Recorder can lead to substantial blocking, or in the worst case, it can lead even to deadlocks. In order to avoid this, the preferred embodiment recommends dividing the actions involving derived fields into two parts, as called, e.g., the Change Recorder and the Change Propagator.

Figure 2:
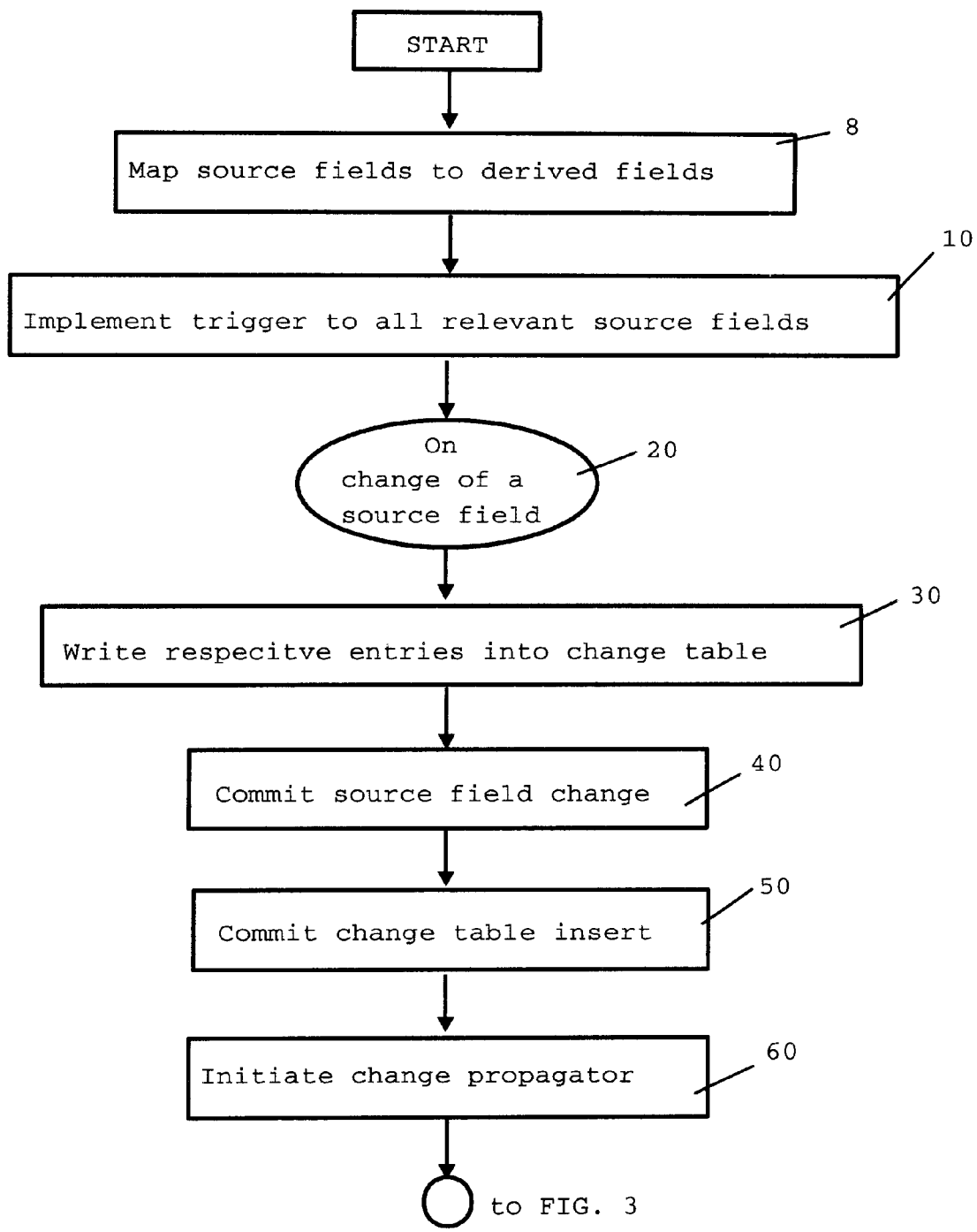
FIG. 2 is a schematic representation of a flow chart showing the control flow and the main steps in the algorithm used for implementing the Change Recorder according to the invention.
Figure 3:
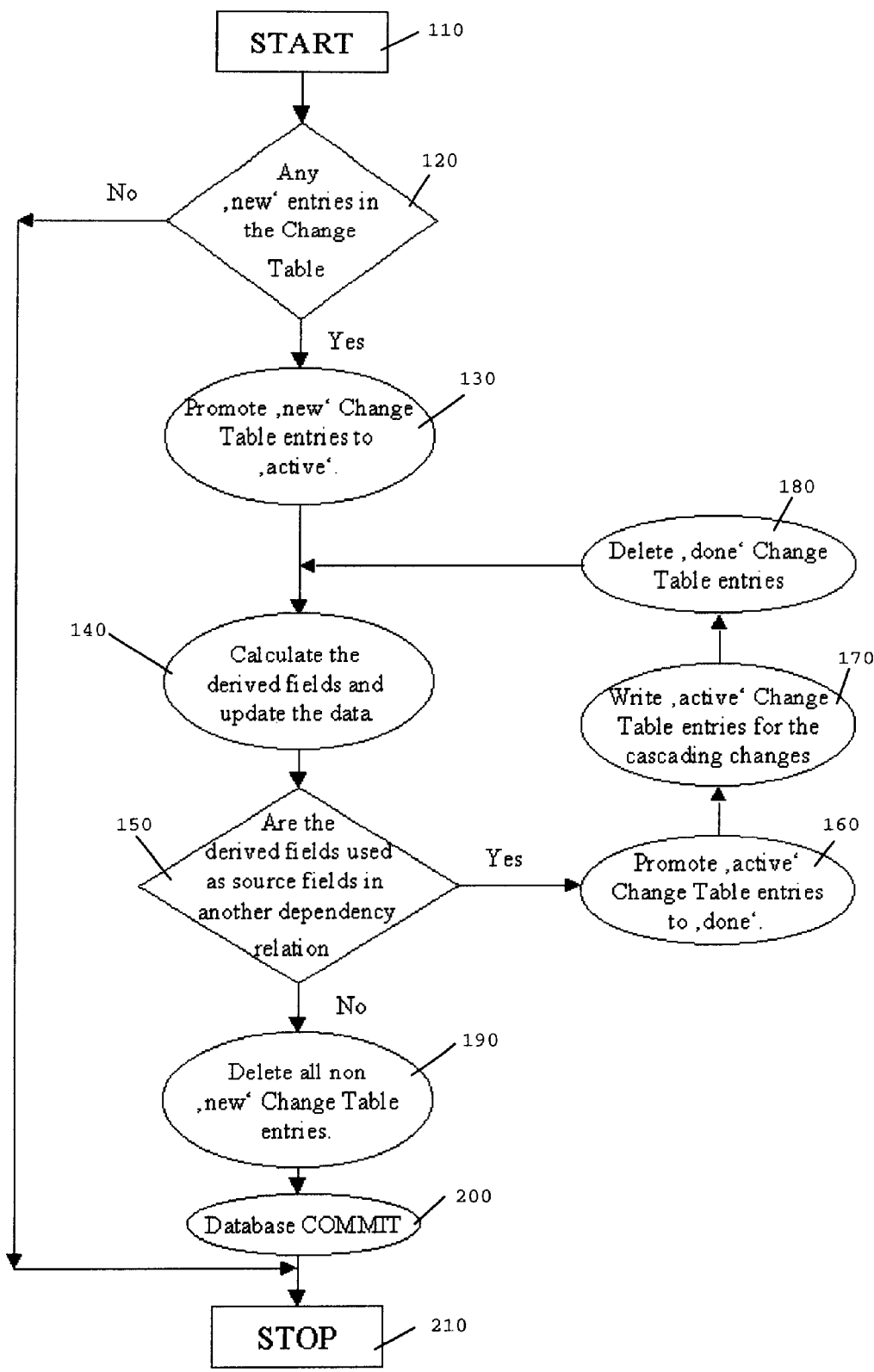
FIG. 3 is a schematic representation of a flow chart showing the control flow and the main steps in the algorithm used for implementing the Change Propagator according to the invention.

With reference to FIG. 3 the Change Propagator is generally responsible for propagating a change to a source field throughout the database, steps 110 to 210 in FIG. 2. The change to a single source field may result directly in many derived fields in the database being updated, as a source field may be involved in several dependency relations or related to many other records in the database.

In more detail, after the start of the Change Propagator which can run in an endless loop in hard-coded form, for example, the decision is taken if there are any new entries in the change table as described above with reference to FIG. 1—decision 120.

If yes, then said change table is promoted 'active' for providing a signal in order to know that additional actions must be taken now—step 130.

Then in a step 140 by help of an inspection of the source field/derived field mapping list described above all relevant values of derived fields are calculated and database update is performed.

Then in a decision 150, it is determined if the obligation to propagate changes further on must be taken.

If there are other field(s) being derived by that source field updated, see the YES-branch of decision 150, then, first the 'active' change table entries are first marked as 'done'—step 160, and then, the source field/derived field mapping table described further above is further scanned for subsequent changes necessary for 'second degree' derived fields, step 170, and entries which are marked as 'done are deleted from the Change table,—step 180.

Then, a loop is reentered comprising steps 140 to 180 with working on third degree derived fields, and so on, until no derived fields are to be found in this 'cascade' of fields.

On exiting said loop with a NO—condition in decision 150 all change table entries which are not new are deleted for clearing the change table—step 190.

Then, in a step 200 all changes to the change table are committed to the database system and the procedure can be terminated—step 210—for the next call.

Additionally, the Change Propagator is also responsible for updates to fields resulting from so-called cascading changes. Cascading changes occur when a derived field is also a source field in another relation.

This is best illustrated with reference to FIG. 2 and with the following example illustrating a cascading change from Node.status to Link.status.

In this example a new entity "Link" is added. The new entity Link models a network connection between two Port entities.

The fields of the entity Link are described in the following table.

| Field | Description |
| --- | --- |
| id | Unique Identifier |
| name | Name of the Link |
| fromPortId | Identifier of the originating port |
| toPortId | Identifier of the destination port |
| status | status of the connection |

Link has its own status, reflecting its ability to transmit data. This status may be 'down' in the case of a cable being cut or other physical damage to the connection. The Link status is also derived from the status of the 'from' and 'to' Ports. In the example depicted above, this means that there is a dependent relation 'veto' between Port and Link. This veto relation means, in the case of a 'from' or 'to' Port having the status down, the status of the Link is also down, i.e. the link cannot transmit data if the port is not working.

The example depicted above illustrates the basis for a cascading change. A change to the source field Node.status involves an update to the derived field Port.status due to the dependency relation 'veto' between Node and Port. However, the change to Node.Status has a cascading effect because Port.status is in turn a source field in the dependency relation 'veto' between the entities Port and Link. The Change Propagator is responsible not only for propagating to the derived field Port.Status but also further to the field Link.Status. A change to the status field of a Node may then result in the change of the status for a Link, despite the fact that there is no direct dependency relation between the two entities Node and Link. Thus, if a node is shut down, then not only the node is down and all of its ports are down, but also every link that goes to a port in that node is down.

According to the invention, preferably, all direct changes and cascading changes to derived fields occur in a single transaction. This transaction also involves deleting the entries in the change table that were in the change table at the beginning of the Change Propagator transaction. The general flow of processing is illustrated in FIG. 2.

The Change Propagator should be implemented as a "singleton" job. That means, there should be only always one Change Propagator running as a database job. It is possible to implement Change Propagators that run in parallel, but the implementation is significantly harder and there is a much bigger chance of blocking or causing deadlocks.

Going back now to the blocking problem illustrated in the "network operator" example given further above. The introduction of the Change Propagator allows transaction B to complete. This is because transaction A does not take a lock out on the status of Node in the trigger of the Change Recorder any more.

Next, the preferred timing of the Change Propagator will be described.

The blocking problem described above is resolved at the cost of potential inconsistencies. The degree to which inconsistencies, are tolerable depends on the problem domain. In the example of network management given further above it is most likely acceptable that a completely consistent picture of the network is available after every 5, 10 or even 60 seconds. The calculation of a highly visible stock index, however, may have a tolerance of a tenth of a second.

According to the invention the time window of inconsistency can be prescribed in two different ways.

First, the Change Propagator is triggered by the Change Recorder commit.

After the Change Recorder has committed its changes—step 40 from FIG. 2—the Change Propagator job is started—step 110 in FIG. 3. This has the advantage that the time window of inconsistency is held to a minimum. A slight disadvantage of this approach is that for every change a job has to be started, and there will be actually no easy way for any optimizing of the activities of the Change Propagator.

As to the second way to control the timing of the change propagator an example is given where such an optimization is needed.

In this example a faulty port has a tricky mechanical problem: It changes its status very rapidly from down to up and back again. Each change thus results in many changes in the database. The database is constantly under load.

According to the present invention, in this situation a starting interval for the Change Recorder is defined: The Change Propagator is configured to start after a configurable time interval. The time window of inconsistency begins with the commit of the Change Recorder and ends after the compute and commit of the Change Propagator after the Change Propagator had started.

The advantage of this solution is that entries in the Change Table from multiple transactions can be processed at the same time. The problem situation illustrated in the last example is thus alleviated because several "up"-to-"down" status changes can be reduced to a single change, or, in the case of "up" to "down" followed by "down" to "up" no change will occur at all.

The disadvantage is that the window of inconsistency is longer than in the first way described.

Next, a preferred feature of the present invention will be described concerning a performance enhancement through Propagation Fields.

Before explaining the purpose of propagation fields, it is necessary to illustrate the logic involved in deriving the status of the Node.

The status of the node is derived from the status of all of its ports. Thus it is a datum which is derived from a plurality of entities. For example, the status of the node can have one of three values which are depicted with the respective meaning in the table next below.

| | |
|---|---|
| up | all ports have a status of up |
| down | all ports have a status of down |
| partly down | some ports are up and some are down |

The logic for changing the node's status is already much more complex. The table next below gives a summary thereof:

| old status | new status | event |
|---|---|---|
| up | partly down | a port went down, but some ports still have status up |
| partly down | down | the last port that was up is now down |
| down | partly down | a port went up, but some ports are still down |
| partly down | up | the last port that was down is now up |
| partly down | partly down | a port changed, but some ports are up and some are down |
| up | down | the single port in a node, change from up to down |
| down | up | the single port in a node, changed from down to up |

An analysis of the relationship.between node and port quickly shows that in order to calculate the status of the node, information is needed about the status of all of the ports of the node. In database terms that means, that although only one port has changed its status, all of the ports need to be accessed in order to calculate the status of the node. This represents a complete contradiction to the previously defined advantage of storing derived data redundantly, namely quick data access and calculation at run-time.

In order to overcome such divergences the present invention's concepts propose to implement so-called Propagation Fields. A Propagation Field is an extra field associated with an entity. Only entities with derived fields should have Propagation Fields. The Propagation Field is not part of the 'natural' semantic encapsulation of an entity, but instead, it solely serves to improve the calculation of the derived fields and to avoid unnecessary database read processes.

In the above example referring to the propagation of a change to a Port Status to the Node Status, two additional Propagation Fields are needed for the entity Node. They are depicted in the table below:

| Propagation Field | Description |
|---|---|
| upCounter | Count of all Ports contained in the Node with a status of up |
| downCounter | Count of all Ports contained in the Node with a status of down |

These Propagation Fields are maintained by both the Change Recorder during inserts and deletes and as well by the Change Propagator during propagation. These additional Propagation Fields summarize a collection of single facts into a concentrated and somehow inexact form 3 as they ignore which ports are down and which are up, but on the other hand they enable the calculation of the status of the Node without having to access any additional Port records. This effect can be examined by looking at the change event table given above. In the table given next below the logic column upCounter is abbreviated to uC and downCounter is abbreviated to dC.

| logic | old status | new status | event |
|---|---|---|---|
| uC > 0 && dC > 0 | up | partly down | a port went down, but some ports still have status up |
| uC == 0 | partly down | down | the last port that was up is now down |
| uC > 0 && dC > 0 | down | partly down | a port went up, but some ports are still down |
| uD == 0 | partly down | up | the last port that was down is now up |
| uC > 0 && dC > 0 | partly down | partly down | a port changed, but some ports are up and some are down. |
| uC == 0 | up | down | the single port in a node, changed from up to down |
| uD == 0 | down | up | the single port in a node, changed from down to up |

As can be seen in the left most logic column of the table above, the calculation of the status of the node can now be achieved by examining the data in the single Node record and the change to a single Port status. The change to a Port status changes either the upCounter or downCounter. After this 'counter' change, the status of the node can be calculated by evaluating which of the three criteria in the 'logic' column has been fulfilled, namely upCounter equals 0 (result is Node status is down downCounter equal 0 (result is Node status is both upCounter and downCounter are greater than zero (result is that NodeStatus is partly down Thus, no other information about other Ports is needed.

For reasons of increased clarity, the dependencies in FIG. 1 do not incorporate the Propagation fields described above. Thus, it should be added that the value of the derived field Node.status is actually derived from the two Propagation Fields Node.upCounter and Node.downCounter as illustrated in the table and the list above. The values of the Propagation Fields, however, are derived from the status of the Ports in the Node, i.e., the fields Port.nodeId and Port.Status.

In conclusion it should be noted that not every dependency relation requires Propagation Fields. In the case of an account balance being the sum of all account transactions, the delta representing the gap relative to the current balance is easily calculated from the change to an account transaction. No propagation fields are required because the other account transaction records are not needed to calculate the new account balance.

While the invention has been particularly shown and described with respect to preferred embodiments therof, it will be understood by those skilled in the art that the foregoing and other changes in form and details may be made therein without departing from the spirit and scope of the invention.

Having thus described our invention, what we claim as new, and desire to secure by letters patent is:

1. A method for improving access to a database of a computer, said database having source fields including source data, derived fields including dependent data, and database information extendible to include information on dependent data, the method comprising the steps of:

provinding formalized information about dependencies between source and derived fields in order to consistently update dependent data in derived fields of the database; and using said formalized information as an extension to the database information, including the steps of
i) using a dependency model identifying source fields and related derived fields, said model including information for identifying and calculating dependent data, based on a change of related source data, according to predetermined rules,
ii) recording changes to dependent data, and
iii) propagating changes, including cascaded changes, in data in the derived data fields calculated using said rules.

2. The method according to claim 1, wherein the database is a relational database and further comprising the step of storing said dependency model as at least one table in said relational database.

3. The method according to claim 2, wherein the step of propagating changes includes the step of using propagation fields associated with at least one derived field, and holding concentrated information about a plurality of related source fields.

4. The method according to claim 3, wherein the step of recording changes includes the step of
storing all changes to source data involved in changes to dependent data into a change table after committing said changes to dependent data to the database.

5. The method according to claim 4, wherein the step of storing said changes to the source data includes the step of
storing said changes to source data into the change table a predetermined time interval after committing said changes to dependent data to the database.

6. The method according to the claim 5, wherein the step of recording changes is implemented as a database trigger responsive to changes of a source field.

7. The method according to claim 4, the step of propagating changes is implemented as a database trigger responsive to changes of a source field.

8. The method according to claim 7, the step of propagating changes is implemented as a timeable database job.

9. A system for improving access to a database of a computer, said database having source fields including source data, derived fields including dependent data, and database information extendible to include information on dependent data, the system comprising:

means for providing formalized information about dependencies between source and derived fields in order to consistently update dependent data derived fields of in the database; and means for using said formalized information as an extension to the database information, including
i) means for using a dependency model identifying source fields and related derived fields, said model including information identifying and calculating dependent data, based on a change of related source data, according to predetermined rules,
ii) means for recording changes to dependent data, and
iii) means for propagating changes, including cascaded changes, in data in the derived data fields calculated using said rules.

10. The database system according to claim 9, further comprising a database table for storing changes to source data.

11. A computer program for execution in a data processing system for improving access to a database of a computer, said database having source fields including source data, derived fields including dependent data, and database information extendible to include information on dependent data, the computer program comprising computer program code portions for performing the steps of:

providing formalized information about dependencies between source and derived fields in order to consistently update dependent data derived fields of in the database; and using said formalized information as an extension to the database information, including the steps of
i) using a dependency model identifying source fields and related derived fields, said model including information identifying and calculating dependent data, based on a change of related source data, according to predetermined rules,
ii) recording changes to dependent data, and
iii) propagating changes, including cascaded changes, in data in the derived data fields calculated using said rules.

12. A computer program product stored on a computer usable medium for improving access to a database of a computer, said database having source fields including source data, derived fields including dependent data, and database information extendible to include information on dependent data, the computer program product comprising computer readable program means for causing a computer to perform the method steps of:

providing formalized information about dependencies between source and derived fields in order to consistently update dependent data derived fields of in the database; and using said formalized information as an extension to the database information, including the steps of
i) using a dependency model identifying source fields and related derived fields, said model including information identifying and calculating dependent data, based on a change of related source data, according to predetermined rules,
ii) recording changes to dependent data, and
iii) propagating changes, including cascaded changes, in data in the derived data fields calculated using said rules.

* * * * *